United States Patent [19]

Nishi et al.

[11] Patent Number: 4,660,070

[45] Date of Patent: Apr. 21, 1987

[54] VIDEO DISPLAY PROCESSOR

[75] Inventors: Kazuhiko Nishi; Takatoshi Ishii; Ryozo Yamashita, all of Tokyo; Shigemitsu Yamaoka; Takatoshi Okumura, both of Hamamatsu, all of Japan

[73] Assignees: ASCII Corporation, Tokyo; Nippon Gakki Seizo Kabushiki Kaisha, Hamamatsu, both of Japan

[21] Appl. No.: 736,828

[22] Filed: May 22, 1985

[30] Foreign Application Priority Data

May 25, 1984 [JP] Japan ............................... 59-106092

[51] Int. Cl.[4] ............................................... H04N 5/44

[52] U.S. Cl. .......................................... 358/11; 358/22

[58] Field of Search ........................ 358/10, 11, 12, 22, 358/81, 82, 903, 140; 340/703, 744, 750

[56] References Cited

U.S. PATENT DOCUMENTS

| | | | |
|---|---|---|---|
| 4,243,984 | 1/1981 | Ackley et al. | 340/703 |
| 4,262,302 | 4/1981 | Sexton | 358/10 |
| 4,286,320 | 8/1981 | Ott | 364/200 |
| 4,374,395 | 2/1983 | Hermann et al. | 358/22 |
| 4,387,406 | 6/1983 | Ott | 358/310 |
| 4,442,428 | 4/1984 | Dean | 358/10 |
| 4,587,569 | 5/1986 | Nakamura | 358/11 |

*Primary Examiner*—Michael A. Masinick
*Attorney, Agent, or Firm*—Cushman, Darby & Cushman

[57] ABSTRACT

A video display processor (VDP) for use with a central processing unit, a video RAM (VRAM) and a video display unit is capable of writing video image data supplied from an external video device such as a television set into the VRAM. The VDP comprises a first input terminal for receiving the external video image data and a second input terminal for receiving horizontal and vertical synchronization signals from the external video device. The VDP generates address data in accordance with the horizontal and vertical synchronization signals and supplies the address data to the VRAM when processing of the external video image data is designated. The VDP also supplies the received external video image data to the VRAM thereby to write the external video image data into addresses of the VRAM designated by the address data. The external video image data may be either color codes representative of colors of display elements of a video image displayed at the external video device or data representative of amplitude levels of an analog video signal outputted from the external video device.

7 Claims, 19 Drawing Figures

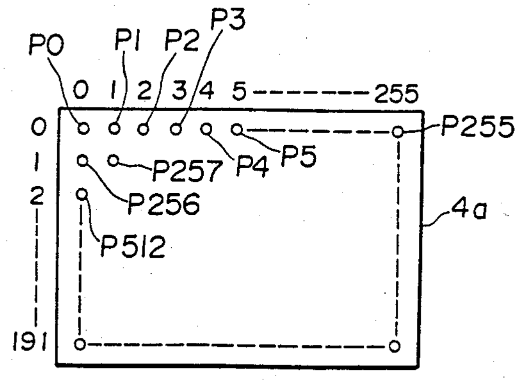
FIG. 2a
FIG. 2b
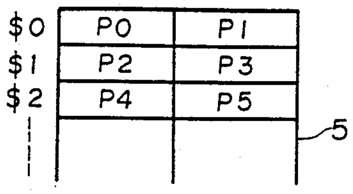
FIG. 3a
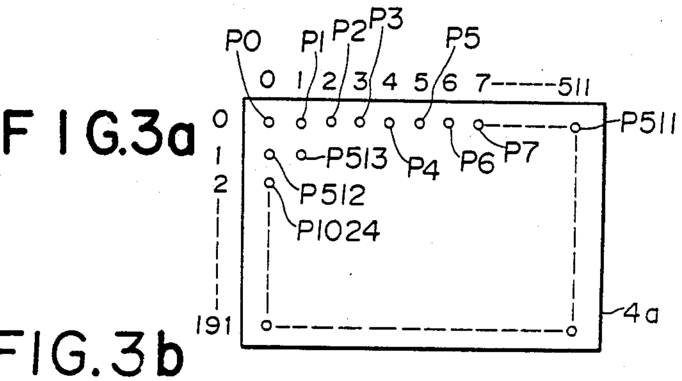
FIG. 3b
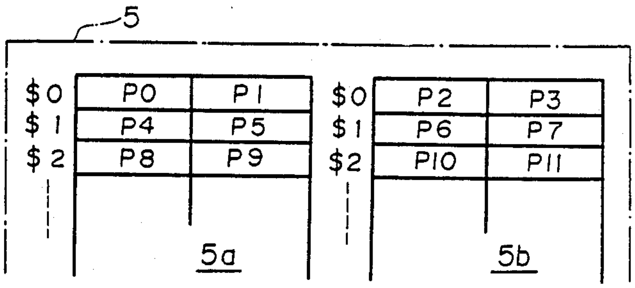

FIG.4a
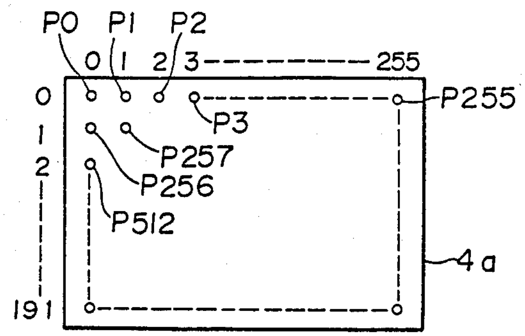
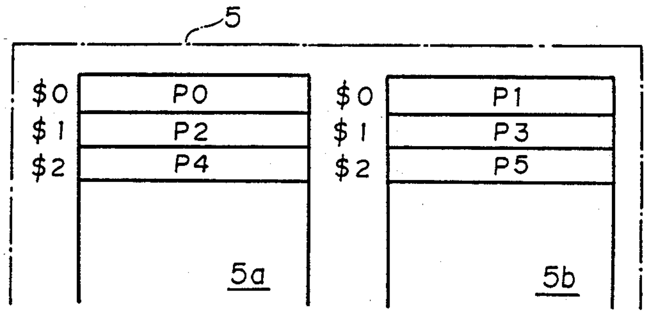
FIG.4b

VIDEO DISPLAY PROCESSOR

BACKGROUND OF THE INVENTION

1. Field of the Invention

The present invention relates to a video display controller for use in terminal equipment for a computer, television game apparatus or the like.

2. Prior Art

There have been developed various kinds of video display processors which, under the control of a central processing unit, read image data from a video RAM (VRAM) and display a color video image on a screen of a CRT (cathode-ray tube) display unit in accordance with the read image data. Examples of such video display processors are shown in U.S. Pat. Nos. 4,286,320, 4,243,984, 4,262,302, 4,374,395 and 4,387,406. However, such a conventional video display processor has not been provided with means for converting a video signal into image data and for writing the image data into the VRAM, or means for storing image data supplied from another video display processor into the VRAM.

SUMMARY OF THE INVENTION

It is therefore an object of the present invention to provide a video display processor which can store image data supplied from an external device into a video RAM.

According to one aspect of the present invention, there is provided a video display processor adapted to be connected to memory means and a video display unit for displaying a video image on a screen of the video display unit in accordance with image data stored in the memory means, the video display processor comprising (a) first receiving means for receiving an external video image data from an external video device; (b) designating means for designating an external mode which is a mode for processing the external video image data; (c) address data generating means for generating address data in accordance with a synchronizing signal synchronized with the external video image data and for supplying the address data to the memory means when the external mode is designated; and (d) first feeding means for feeding the external video image data to respective addresses of the memory means indicated by the address data when the external mode is designated, whereby the external video image data are written into corresponding addresses of the memory means, respectively.

BRIEF DESCRIPTION OF THE DRAWINGS

FIGS. 2*a* and 2*b* are an illustration showing the relation between display elements on a screen of a CRT display unit 4 of the system and corresponding color codes stored in a VRAM 5 of the system in a display mode I;

FIGS. 3*a* and 3*b* are an illustration similar to FIG. 2 but showing such relation in a display mode II;

FIGS. 4*a* and 4*b* are an illustration similar to FIG. 2 but showing such relation in a display mode III;

DESCRIPTION OF THE PREFERRED EMBODIMENTS OF THE INVENTION

Figure 1:
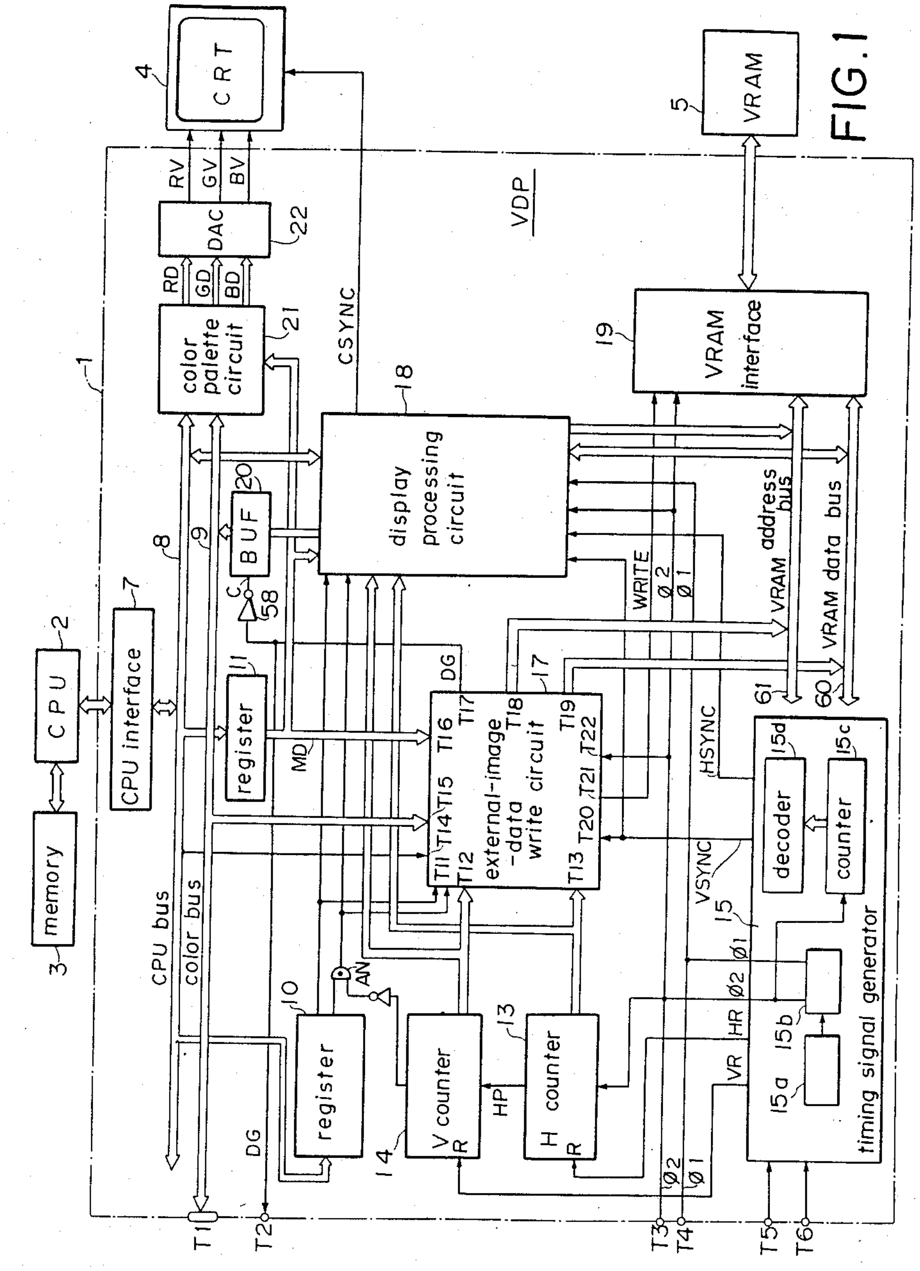
FIG. 1 is a block diagram of a video display control system comprising a video display processor (VDP) 1 provided in accordance with the present invention.

FIG. 1 shows a block diagram of a video display control system comprising a video display processor (hereinafter referred to as VDP) 1 provided in accordance with the present invention. This system comprises a central processing unit (CPU) 2, a memory 3 having a ROM for storing programs to be executed by the CPU 2 and a RAM for storing data, a CRT display unit 4, and a video RAM (VRAM) 5. The VDP 1 comprises a CPU interface 7 connected to the CPU 2, a CPU bus 8 connected to the CPU interface 7, and a color bus 9 which is connected to a terminal T1 of this VDP 1. Connected to the CPU bus 8 is a register 10 into which two-bit address data for selecting one of four storage areas provided in the VRAM 5 is written by the CPU 2. In this case, the first-bit output of the register 10 is directly fed to a display processing circuit 18 and to one of input terminals T11 of an external-image-data write circuit 17, while the second-bit output of the register 10 is fed through an AND gate AN to the display processing circuit 18 and to the other of the input terminals T11 of the external-image-data write circuit 17. The AND gate AN is enabled to open or disabled by the MSB output of a vertical counter (hereinafter referred to as "V counter") 14, the MSB output varying in accordance with the first and second fields of each interlaced video image on a screen of the CRT display unit 4.

The writing of data into the register 10 is performed with respect to each of display modes which will be described later. More specifically, the VRAM 5 has four storage areas and these storage areas are selectively used in accordance with the display modes and the interlace of scanning of the CRT display unit 4. A register 11 connected to the CPU bus 8 is a two-bit register into which mode data MD (data representative of a selected one of the display modes) is written by the CPU 2.

Each of the display modes provided in this video display control system will now be described.

(1) Display mode I

In this display mode I, each color code representative of a color of a display element on a screen 4*a* of the CRT display unit 4 is composed of four bits (capable of designating sixteen colors) and the screen 4*a* is constituted by 256×192 display elements P0, P1, P2, . . . , as shown in FIG. 2-(*a*). When data "0, 0" is written into the register 10, color codes for the display elements P0 and P1, color codes for the display elements P2 and P3, color codes for the display elements P4 and P5, . . . are stored respectively into address "0", address "1", address "2", . . . of the VRAM 5, as shown in FIG. 2-(*b*).

(2) Display mode II

In this display mode II, each color code is composed of four bits (capable of designating sixteen colors) and the screen 4*a* is constituted by 512×192 display elements P0, P1, P2, . . . , as shown in FIG. 3-(*a*). In this case, the VRAM 5 is formed by first and second memories 5*a* and 5*b*, and color codes for the display elements P0 and P1, color codes for the display elements P2 and P3, color codes for the display elements P4 and P5, color codes for the display elements P6 and P7, . . . are stored respectively into address "0" of the first memory 5*a*, address "0" of the second memory 5*b*, address "1" of the first memory 5*a*, address "1" of the second memory 5*b*, . . . , as shown in FIG. 3-(*b*).

(3) Display mode III

In this display mode III, each color code is composed of eight bits (capable of designating 256 colors) and the screen 4*a* is constituted by 256×192 display elements P0, P1, P2, . . ., as shown in FIG. 4-(*a*). In this case, the VRAM 5 is formed by the first and second memories 5*a* and 5*b* as in the case of the display mode II, and a color code for the display element P0, a color code for the display element P1, a color code for the display element P2, a color code for the display element P3, . . . are stored respectively into address "0" of the first memory 5*a*, address "0" of the second memory 5*b*, address "1" of the first memory 5*a*, address "1" of the second memory 5*b*, . . . , as shown in FIG. 4-(*b*).

And one of the above three display modes I, II and III is selected through the mode data MD.

Referring again to FIG. 1, the VDP 1 further comprises a horizontal counter (H counter) 13 and a timing signal generator 15. The timing signal generator 15 comprises a clock pulse generator 15*a* for generating a reference clock signal having a period of 46.5 nsec by means of a X'tal oscillator and a frequency divider 15*b* for dividing the frequency of the reference clock signal to produce a clock pulse $\phi 1$ having a period of 93 nsec and a clock pulse $\phi 2$ having a period of 186 nsec. The timing signal generator 15 also comprises a reference timing counter 15*c* for up-counting the clock pulse $\phi 2$ and a decoder 15*d* for decoding a count output of the reference timing counter 15*c*. This timing signal generator 15 generates a horizontal synchronization signal HSYNC and a vertical synchronization signal VSYNC in accordance with the output of the reference timing counter 15*c*, and these synchronization signals HSYNC and VSYNC are combined at the display processing circuit 18 to produce a composite synchronization signal CSYNC which is supplied to the CRT display unit 4. The scanning of the display screen 4*a* by an electron beam is thus synchronized with the composite synchronization signal CSYNC. The timing signal generator 15 also outputs, in accordance with the output of the reference counter 15*c*, reset signals HR and VR respectively to reset input terminals R of the H and V counters 13 and 14. In this case, the reset signal VR is outputted when the display element P0, which is located at the left end of the uppermost scanning line on the screen 4*a*, is to be displayed, while the reset signal HR is outputted when the leftmost display element on each horizontal scanning line is to be displayed.

The H counter 13 is a binary counter having a count range of "0" to "340" for counting the clock pulse $\phi 2$ (186 nsec) and outputs to the V counter 14 a pulse signal HP each time the clock pulse $\phi 2$ is counted 341 times. The count output of this H counter 13 represents a horizontal scanning position of the electron beam of the CRT display unit 4 so that the actual display of display elements is performed during the time when the count output of the H counter 13 is between "0" and "255". The period when the count output of the H counter 13 varies from "256" to "340" is a horizontal non-display (blanking) period. The V counter 14 is a binary counter having a count range of "0" to "261" for counting the pulse signal HP. The count output of this V counter 14 represents a vertical scanning position of the electron beam of the CRT display unit 4 so that the actual display of display elements is performed during the time when the count output of the V counter 14 is between "0" and "191". The period when the count output of the V counter 14 varies from "192" to "261" is a vertical nondisplay (blanking) period.

The external-image-data write circuit 17 is provided for receiving an external image data, which is supplied from an external device (not shown in FIG. 1) to the color bus 9 through the terminal T1, and for writing the received image data into the VRAM 5 through a VRAM interface 19. The construction of this external-image-data write circuit 17 will be described later. The display processing circuit 18 receives color codes supplied from the CPU 2 through the CPU interface 7 and stores the received color codes into the VRAM 5 through the VRAM interface 19. Upon receipt of a display command from the CPU 2, the display processing circuit 18 outputs the composite synchronization signal CSYNC to the CRT display unit 4. And at the same time, the display processing circuit 18 reads the color codes from the VRAM 5 and outputs the read color codes through a buffer 20 onto the color bus 9 in synchronism with the scanning position of the electron beam of the CRT display unit 4. The color codes thus outputted onto the color bus 9 are supplied to a color palette circuit 21.

The color palette circuit 21 is a kind of code converter and converts each of the color codes (four bits in the display modes I and II) into color data composed of nine bits. The color palette circuit 21 comprises, for example, sixteen nine-bit registers #0 to #15 (not shown) each for previously storing one color data and a decoder which decodes each of the supplied color codes and enables in accordance with the decode result one of the registers #0 to #15 to output the color data contained therein. The first to third bits, fourth to sixth bits and seventh to ninth bits of the color data outputted from the color palette circuit 21 are supplied to a digital-to-analog converter (DAC) 22 as blue color data BD, green color data GD and red color data RD, respectively. In the display mode III, the color palette circuit 21 supplies the first to third bits, fourth to sixth bits and seventh to eighth bits of the color code appearing on the color bus 9 to the DAC 22 as the blue color data BD, green color data GD and red color data RD, respectively. Thus, in the display mode III, the color data contained in the nine-bit registers of the color palette circuit 21 are not used. The DAC 22 converts the color data RD, GD and BD respectively into analog color signals RV, GV and BV and supplies these analog color signals to the CRT display unit 4, whereby a color video image is displayed on the screen 4*a* of the CRT display unit 4. Incidentally, the time required for displaying one display element is 186 nsec in the display modes I and III, and is 93 nsec in the display mode II.

The construction of the external-image-data write circuit 17 will now be more fully described with reference to FIG. 5.

The external-image-data write circuit 17 comprises a one-bit register 30 whose data input terminal is connected through a terminal T14 to the CPU bus 8 (FIG. 1). The CPU commands this external-image-data write circuit 17 to process an external image data, i.e., to write the external image data into the VRAM 5, by storing one-bit data of "1" into the register 30. This register 30 may be constituted by a flip-flop such as a D-type flip-flop and a J-K flip-flop. A write signal WE of the CPU 2 is supplied to the register 30, but the signal WE is omitted from FIG. 5 for simplicity. An output of the register 30 is supplied to a data input terminal D of a D-type flip-flop 31 which outputs the data supplied from the register 30 from an output terminal Q thereof when the vertical synchronization signal VSYNC is supplied to its clock input terminal CK through a terminal T20. FIG. 6 shows, by way of example, the relation of the output of the register 30, vertical synchronization signal VSYNC and output signal DG of the D-type flip-flop 31. As is apparent from FIG. 6, the output signal DG of the D-type flip-flop 31 is synchronized with the vertical synchronization signal VSYNC. The processing of the external image data is performed during the period when the output signal DG of the D-type flip-flop 31 is "1".

A buffer 32 is enabled to output data supplied to data input terminals thereof when a "1" signal is applied to a control terminal C thereof, whereas data output terminals of this buffer 32 are brought into a high impedance state when a "0" signal is applied to the control terminal C. A decoder 34 decodes the mode data MD supplied thereto through a terminal T16 and outputs, in accordance with the decode results, a mode signal M1 of "1" when the mode data MD represents the display mode I, a mode signal M2 of "1" when the mode data MD represents the display mode II, and a mode signal M3 of "1" when the mode data MD represents the display mode III.

A seven-bit binary counter 36 up-counts a signal HQ0 which is the LSB of the count output of the H counter 13 fed to this external-image-data write circuit 17 through a terminal T13. This counter 36 is reset when a "1" signal is supplied to its reset terminal R from an output terminal <1> of a decoder 38. A decoder 37 decodes the count output of the V counter 14, which is supplied through a terminal T12, and outputs a "1" signal from its output terminal <0> when the count output of the V counter 14 is "0" and also outputs a "1" signal from its output terminal <192> when the count output is "192". The decoder 38 decodes the count output of the H counter 13 in a similar manner. Shown at 39 and 40 are RS flip-flops, 41 and 43 AND gates, and 42 an OR gate.

Shown at 44 is a delay register whose input terminal is supplied with the lower four bits of data on the color bus 9 which is connected to a terminal T15. This delay register 44 is triggered by the clock pulse $\phi 2$ which is supplied through a terminal T22. An eight-bit latch 45 latches data supplied to its input terminals LD0 to LD7 when the signal HQ0 is applied to its load terminal L. An eight-bit delay register 46 is supplied with the data on the color bus 9 at its data input terminal and is triggered by the clock pulse $\phi 2$. A selector 47 outputs data supplied to its input terminal A from the latch 45 when the mode signal M1 applied to its selection terminal SA is "1", and outputs data supplied to its input terminal B from the delay register 46 when the mode signal M1 is "0". A delay register 48 is supplied with the data outputted from the selector 47 and is triggered by the clock pulse $\phi 2$. A buffer 49 is enabled to output the data supplied from the delay register 48 when a signal WRITE applied to its control terminal C is "1", and is disabled when the signal WRITE is "0".

The operation of this system will now be described with respect to the processing of the external image data.

(a) The processing of the external image data in the display mode I

Figure 7:
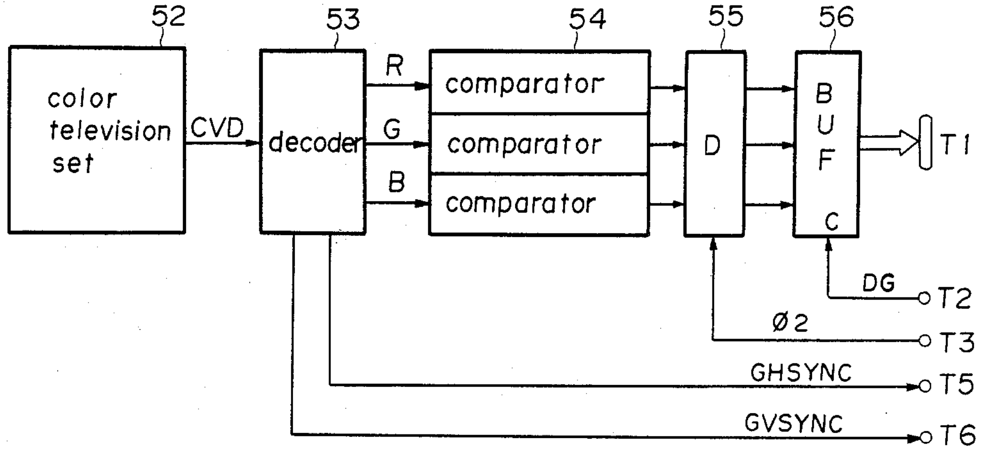
FIG. 7 is a block diagram of an external circuit which is connected to the VDP 1 in the display mode I.

In this case, an external circuit such as one shown in FIG. 7 is connected to the terminals T1 to T3, T5 and T6 of the VDP 1. This external circuit comprises an ordinary color television set 52 having an output terminal for outputting a composite color video signal CVD and a decoder 53 which produces analog color signals R, G and B in accordance with the composite color video signal CVD and also extracts a horizontal synchronization signal GHSYNC and a vertical synchronization signal GVSYNC from the signal CVD. The horizontal and vertical synchronization signals GHSYNC and GVSYNC are supplied to the timing signal generator 15 (FIG. 1) through the terminals T5 and T6, whereupon the timing signal generator 15 begins to operate in synchronism with the synchronization signals GHSYNC and GVSYNC. More specifically, the synchronization signals HSYNC and VSYNC are outputted from the timing signal generator 15 when the synchronization signals GHSYNC and GVSYNC are outputted from the decoder 53, respectively, and the reset signals HR and VR are outputted from the timing signal generator 15 at timings determined in accordance with the synchronization signals GHSYNC and GVSYNC. Referring again to FIG. 7, three comparators 54 compare signal levels of the color signals R, G and B with predetermined signal levels, respectively. Each of the comparators 54 outputs a "1"signal when a signal level of the input signal is higher than the corresponding predetermined signal level and outputs a "0" signal when the input signal level is lower than the corresponding predetermined signal level. Thus, the comparators 54 convert the analog color signals R, G and B into a three-bit color code (capable of designating eight colors). A delay register 55 is triggered by the clock pulse $\phi 2$ supplied thereto through the terminal T3, and a buffer 56 is enabled to output data, supplied from the delay register 55, onto the lower three bit-lines of the color bus 9 through the terminal T1 when the signal DG applied to its control terminal C is "1".

Figure 5:
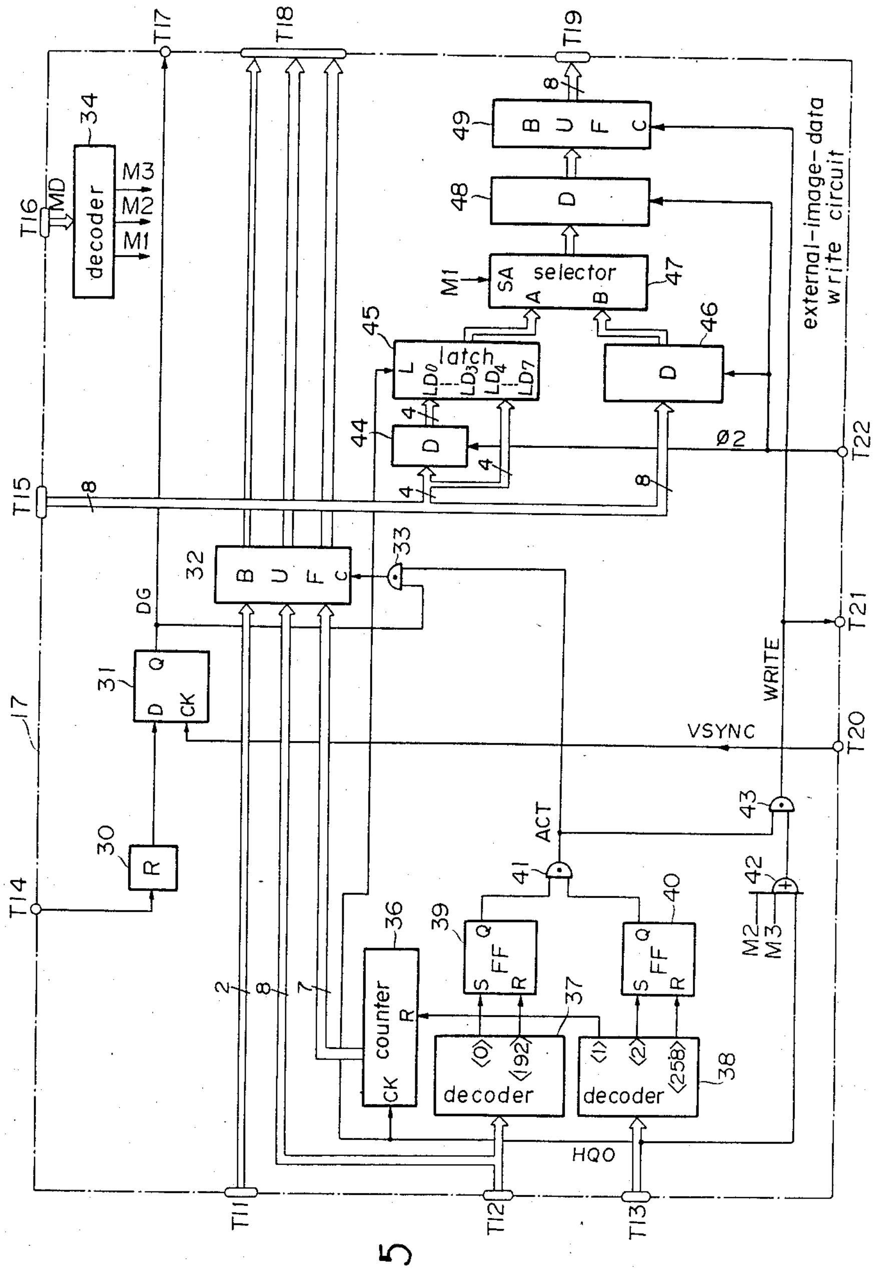
FIG. 5 is a block diagram of an external-image-data write circuit 17 of the VDP 1 of the system of FIG. 1.
Figure 6:
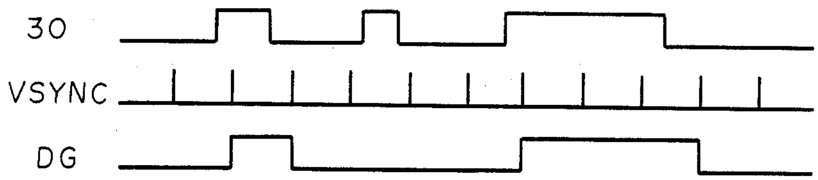
FIG. 6 is a timing chart of the output of the register 30, vertical synchronization signal VSYNC and signal DG.
Figure 8:
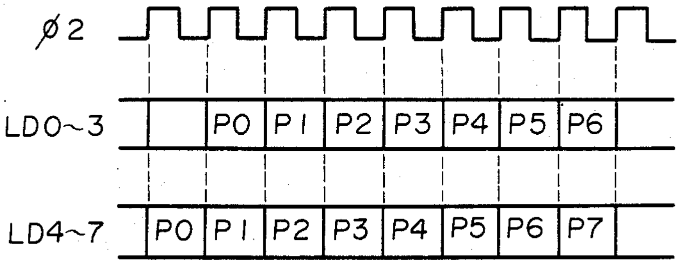
FIG. 8 is a timing chart of the clock signal $\phi 2$, data at the input terminals LD0 to LD3 of the latch 45 of the circuit 17 of FIG. 5.
Figure 9:
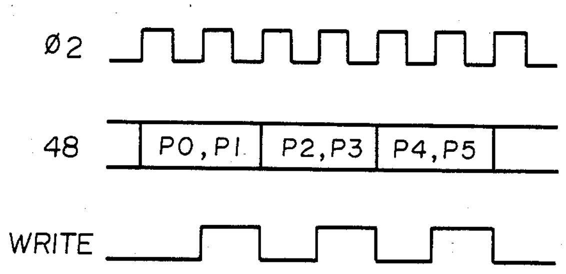
FIG. 9 is a timing chart of the clock signal $\phi 2$, data at the input terminal of the delay register 48 of the circuit 17 of FIG. 5, and the signal WRITE appearing in the circuit 17 of FIG. 5.

When it is desired to process the external image data in the display mode I, the CPU 2 first stores data representative of the display mode I into the register 11 (FIG. 1), then stores two-bit data representative of a desired storage area of the VRAM 5 into the register 10, and subsequently stores data of "1" into the register 30 (FIG. 5). When the synchronization signal VSYNC is outputted after the writing of the "1" signal into the register 30, i.e., when the synchronization signal GVSYNC is outputted, the signal DG outputted from the D-type flip-flop 31 becomes "1". This "1" signal is supplied through the terminals T17 and T2 to the buffer 56 (FIG. 7), so that the buffer 56 is enabled to output the data supplied from the delay register 55. The signal DG of "1" outputted from the D-type flip-flop 31 is also supplied through an inverter 58 (FIG. 1) to the control terminal C of the buffer 20, so that the buffer 20 is brought into a disabled state. After the buffer 56 is enabled, color codes representative of colors of the display elements P0, P1, P2, P3 . . . of the external video image are sequentially outputted from the delay register 55 in accordance with the clock pulse $\phi 2$ and are supplied through the buffer 56 and terminal T1 to the lower three bit-lines of the color bus 9. The color codes thus supplied to the color bus 9 are fed through the terminal T15 (FIG. 5) to the delay register 44 and to the input terminals LD4 to LD 7 (upper four bits) of the latch 45. The delay register 44 delays the color codes supplied thereto by a time length equal to the period of the clock $\phi 2$ and then delivers the delayed color codes to the input terminals LD0 to LD3 (upper four bits) of the latch 45. Thus, the color codes at the input terminals LD0 to LD7 vary as shown in FIG. 8 where P0, P1, P1, . . . represent the color codes for the display elements P0, P1, P2, . . . . The color codes appearing at the input terminals LD0 to LD7 are sequentially loaded into the latch 45 by the signal HQ0 whose period is twice as long as that of the clock pulse $\phi 2$. The color codes loaded into the latch 45 are supplied through the selector 47 to the delay register 48 which delays the color codes by a time length equal to the period of the pulse $\phi 2$ and then supplies the delayed color codes to the input terminal of the buffer 49. Thus, the color codes appearing at the input terminal of the buffer 49 varies as shown in FIG. 9.

In this display mode I, the mode signal M2 and M3 are both "0", so that the signal HQ0 is supplied to one input terminal of the AND gate 43 through the OR gate 42 (shown in the left bottom portion of FIG. 5). Assuming that a output signal ACT of the AND gate 41 is now "1", the signal HQ0 supplied to the one input terminal of the AND gate 43 is outputted therefrom as the signal WRITE. Thus, the signal WRITE varies as shown in FIG. 9. When the signal WRITE is sequentially applied to the control terminal C of the buffer 49 in accordance with the signal HQ0, the buffer 49 outputs the color codes for the display elements P0 and P1, color codes for the display elements P2 and P3, . . . through the terminal T19 onto an eight-bit VRAM data bus 60 shown in FIG. 1.

The output signal ACT of the AND gate 41 is rendered "1" when the count output of the H counter 13 is between "2" and "257" and when the count output of the V counter 14 is between "0" and "191", whereas, the delay register 55 (FIG. 7) outputs the color codes when the count output of the H counter 13 is between "0" and "255" and when the count output of the V counter 14 is between "0" and "191". The color codes outputted from the delay register 55 are delayed by a time length equal to two periods of the clock pulse $\phi 2$ before being supplied to the the buffer 49 shown in FIG. 5. Thus, the color codes begins to be supplied to the input terminal of the buffer 49 when the signal ACT becomes "1". Also when the signal ACT becomes "1", the AND gate 43 opens and begins to output the signal WRITE, and at the same time, the buffer 32 is enabled since the AND gate 33 outputs a "1" signal.

The output of the buffer 32 is supplied through the terminal T18 (FIG. 5) to a VRAM address bus 61 composed of seventeen bit-lines (FIG. 1). More specifically, the count output of the counter 36 is supplied to the lowermost seven bit-lines of the VRAM address bus 61, the output of the register 10 to the uppermost two bit lines of the VRAM address bus 61, and the count output of the V counter 14 to the rest of the bit-lines of the VRAM address bus 61. Incidentally, the counter 36 is reset when the count output of the H counter 36 becomes "1".

Thus, immediately after the leading edge of the first ACT signal which is outputted during the period when the signal DG is "1", the color codes for the display elements P0 and P1 are outputted onto the VRAM data bus 60, and at the same time data "000. . . 00" indicative of the address "0" is outputted onto the VRAM address bus 61 if the data contained in the register 10 is "0, 0". The color codes and address data are then supplied to the VRAM interface 19 which in turn outputs them to the VRAM 5. And at the same time, the VRAM interface 19 produces a write pulse in accordance with the signal WRITE and clock pulse $\phi 2$ and supplies the write pulse to the VRAM 5. As a result, the color codes for the display elements P0 and P1 are written into the address "0" of the VRAM 5. Thereafter, color codes for the display elements P2 and P3, color codes for the display elements P4 and P5, . . . are sequentially outputted onto the VRAM data bus 60 in accordance with the signal HQ0. During this operation, the contents of the counter 36 is incremented by the signal HQ0 so that data indicative of the address "1", "2", . . . are sequentially outputted onto the VRAM address bus 61 in synchronism with the signal HQ0. As a result, the color codes for the display elements P2 and P3, P4 and P5, . . . are written respectively into the address "1", "2", . . . of the VRAM 5. When the color codes for all of the display elements (256 display elements) on the uppermost scanning line of the screen have been written into the addresses "0" to "127" of the VRAM 5, the content of the V counter 14 is incremented by one. And thereafter, color codes for the display elements on the second scanning line of the screen are sequentially outputted from the delay register 55 (FIG. 7), and these color codes are sequentially written respectively into the address "128", "129", . . . of the VRAM 5. And thereafter, an operation similar to the above-described operation is repeatedly carried out to write the color codes of all the display elements of an external image into the VRAM 5. Incidentally, each color code outputted onto the color bus 9 is also supplied to the color palette circuit 21 so that display operation of the external video image on the screen 4a of the CRT display unit 4 is carried out simultaneously with the writing of the color codes of the external video image into the VRAM 5.

(b) The processing of the external image data in the display mode II

Figure 10:
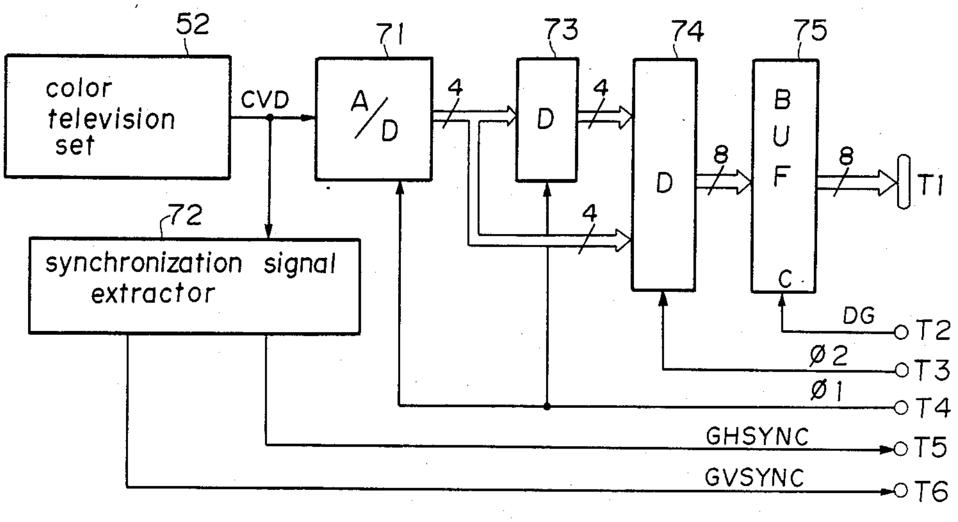
FIG. 10 is a block diagram of an external circuit which is connected to the VDP 1 in the display mode II.

In this case, an external circuit such as one shown in FIG. 10 is connected to the terminals T1 to T6 of the VDP 1. In FIG. 10, a composite color video signal CVD outputted from an ordinary color television set 52 is supplied to an analog-to-digital converter (A/D converter) 71 and to a synchronization signal extractor 72. The A/D converter 71 samples the composite color video signal CVD at an interval determined by the clock pulse $\phi 1$ and converts the sampled signal into four-bit digital data (hereinafter referred to as "video data"). The video data thus outputted from the A/D converter 71 is delayed at the delay register 73 by a time length equal to the period of the clock pulse $\phi 1$, and then supplied to the lower four-bit portion of an input terminal of the delay register 74. The video data outputted from the A/D converter is also supplied directly to the upper four-bit portion of the input terminal of the delay register 74. This delay register 74 loads the video data applied to its input terminal in response to the clock pulse $\phi 2$, whose period is twice as long as that of the clock pulse $\phi 1$, and outputs the loaded video data through buffer 75 and the terminal T1 onto the color bus 9.

Figure 11:
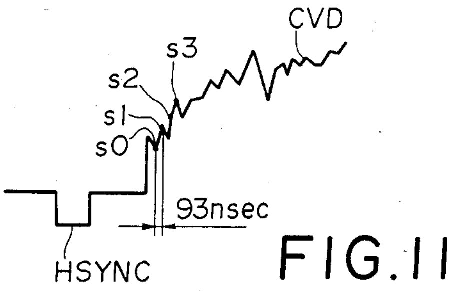
FIG. 11 is a waveform of the composite color video signal CVD outputted from the color television set 52 shown in FIG. 10.
Figure 12:
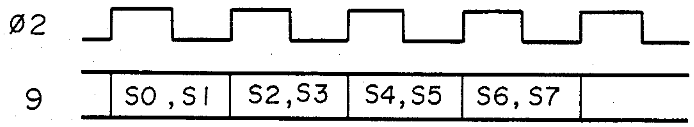
FIG. 12 is a timing chart of the clock pulse $\phi 2$ and the data appearing on the color bus 9 of the VDP 1 of FIG. 1.

With the above arrangement, video data S0, S1, S2, . . . obtained at sampling times s0, s1, s2, . . . shown in FIG. 11 are sequentially outputted onto the color bus 9 in accordance with the clock pulse $\phi 2$, as shown in FIG. 12. On the other hand, the synchronization signal extractor 72 extracts horizontal and vertical synchronization signals from the composite color video signal CVD and supplies the extracted horizontal and vertical synchronization signals as synchronization signals GHSYNC and GVSYNC to the timing signal generator 15 through the terminals T5 and T6.

Figure 13:
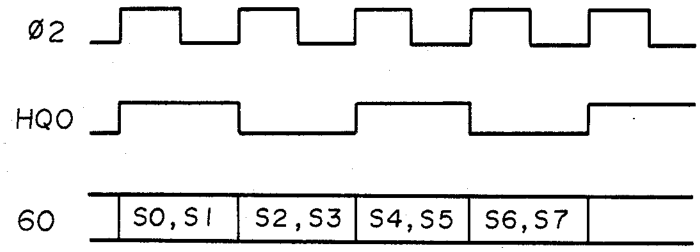
FIG. 13 is a timing chart of the clock pulse $\phi 2$, the signal HQ0 and the data appearing on the VRAM data bus 60.
Figure 14:
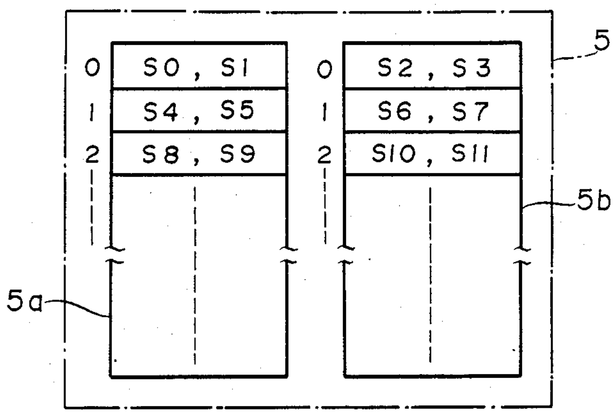
FIG. 14 is an illustration showing the memories 5*a* and 5*b* of the VRAM 5 in which video data S0, S1, S2, . . . are stored.

When it is desired to process the external image data in the display mode II, the CPU 2 first stores data representative of the display mode II into the register 11 (FIG. 1), then stores two-bit data representative of a desired storage area of the VRAM 5 into the register 10, and subsequently stores data of "1" into the register 30 (FIG. 5). Once the "1" signal is stored into the register 30, the signal DG outputted from the D-type flip-flop 31 becomes "1" when the next synchronization signal VSYNC is issued. As a result, the buffer 75 shown in FIG. 10 is enabled to output the video data supplied from the delay register 74, so that the video data S0, S1, S2, . . . are sequentially outputted onto the color bus 9. The eight-bit delay register 46 shown in FIG. 5 loads the video data thus outputted onto the color bus 9 in response to the clock pulse $\phi 2$ and outputs the loaded data onto the VRAM data bus 60 through the selector 47, delay register 48 and buffer 49. Thus, in this display mode II, the video data S0, S1, S2, . . . are outputted onto the VRAM data bus 60 in synchronism with the clock pulse $\phi 2$ as shown in FIG. 13. Incidentally, the output of the OR gate 42 is "1", so that the signal WRITE has the same waveform as that of the signal ACT. On the other hand, data indicating the addresses "0", "1", "2", . . . are supplied to the VRAM address bus 61 in accordance with the signal HQ0 in the case where the data contained in the register 10 is "0, 0". The VRAM interface 19 (FIG. 1) supplies the address data appearing on the VRAM address bus 61 and the video data appearing on the VRAM data bus 60 to the first and second memories 5*a* and 5*b* of the VRAM 5. The VRAM interface 19 also produces write signals in accordance with the clock pulse $\phi 2$ and supplies these write signals alternately to the first and second memories 5*a* and 5*b*. As a result, the video data S0, S1, S2, . . . are sequentially stored in the first and second memories 5*a* and 5*b* in the order shown in FIG. 14.

When it is desired to reproduce the composite color video signal CVD from the video data stored in the VRAM 5, the video data are sequentially read from the VRAM 5 and supplied to a video signal reproduction circuit (not shown) provided in the VDP 1. The video signal reproduction circuit then reproduces the composite color video signal from the read video data and outputs the reproduced color video signal to the CRT display unit 4. When it is desired to display the external video image on the screen 4*a* of the CRT display unit 4 simultaneously with the writing of the video data into the VRAM 5, the video data on the color bus 9 are supplied to the video signal reproduction circuit.

(c) The processing of the external image data in the display mode III

Figure 15:
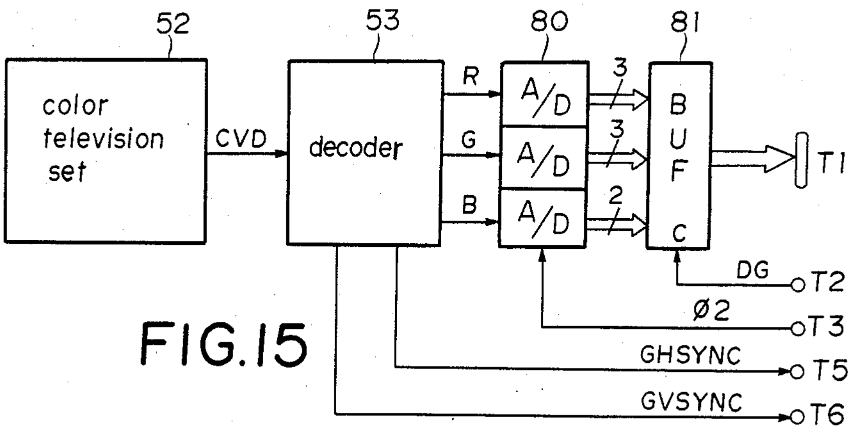
FIG. 15 is a block diagram of an external circuit which is connected to the VDP 1 in the display mode III.

In this display mode, an external circuit such as one shown in FIG. 15 is connected to the terminals T1 to T3, T5 and T6 of the VDP 1. A color television set 52 and a decoder 53 of this external circuit are of the same constructions as those of the external circuit shown in FIG. 7, respectively. A/D converters 80 convert color signals R, G and B into data of three bits, data of three bits and data of two bits, respectively. Thus, a color code of eight bits is outputted from the A/D converters 80 and are supplied to the color bus 9 through a buffer 81 and the terminal T1.

Figure 16:
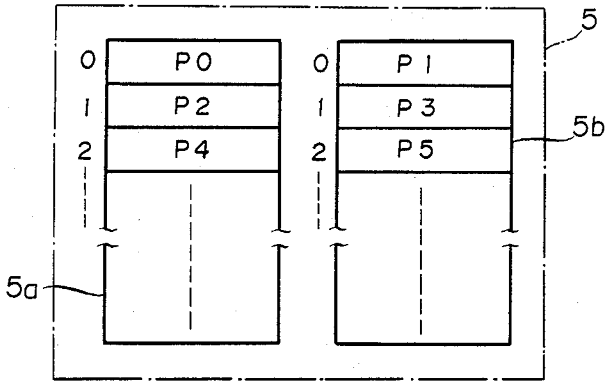
FIG. 16 is an illustration showing the memories 5*a* and 5*b* of the VRAM 5 in which color codes of the display elements P0, P1, P2, . . . . are stored.

When it is desired to process the external image data in this display mode III, the CPU first performs the writing of data representative of the display mode III into the register 11, and then performs the writing of data into the registers 10 and 30. And thereafter, the color codes outputted on the color bus 9 are written into the first and second memories 5*a* and 5*b* of the VRAM 5 in the manner described above for the processing in the display mode II. Thus, the color codes for the display elements P0, P1, P2, . . . are written into the address "0" of the memory 5*a*, address "0" of the memory 5*b*, address "1" of the memory 5*a*, . . . . as shown in FIG. 16.

In this display mode III, the color codes outputted onto the color bus 9 are supplied through the color palette circuit 21 to the DAC 22 which in turn converts each color code into color signals R, G and B and supplies these color signals to the CRT display unit 4. As a result, display of the external video image is performed simultaneously with the writing of their color codes into the VRAM 5.

The VDP 1 described above is so arranged as to store into the VRAM 5 the external video image in accordance with the composite video signal outputted from the color television set. However, this VDP 1 may be arranged to store external video image data in accordance with a composite video signal outputted from other external devices such as a video tape recorder or in accordance with color codes outputted from an external video display apparatus.

What is claimed is:

1. A video display processor adapted to be connected to memory means and a video display unit for displaying a video image on a screen of the video display unit in accordance with image data stored in the memory means, said video display processor comprising:

(a) first receiving means for receiving an external video image data from an external video device;

(b) designating means for designating an external mode which is a mode processing said external video image data;

(c) address data generating means for generating address data in accordance with a synchronizing signal synchronized with said external video image data and for supplying said address data to the memory means when said external mode is designated; and (d) first feeding means for feeding said external video image data to respective addresses of the memory means indicated by said address data when said external mode is designated, whereby said external video image data are written into corresponding addresses of said memory means, respectively.

2. A video display processor according to claim 1, wherein said designating means comprises a flag register controlled by an external control unit connectable to said video display processor.

3. A video display processor according to claim 1, wherein said video display image data is based on a composite video signal generated in said external video device, said synchronizing signal being horizontal and vertical synchronization signals separated from said composite video signal, said video display processor further comprising second receiving means for receiving said horizontal and vertical synchronization signals and period signal generating means for generating a period signal representative of each display period of said composite video signal in accordance with said horizontal and vertical synchronization signals, said feeding means feeding said external video image data to said memory means only when said synchronizing signal is generated.

4. A video display processor according to claim 3, wherein said external video image data are composed of color codes representative of colors of display elements which constitute a video image displayed in accordance with said composite video signal.

5. A video display processor according to claim 3, wherein said external video image data are composed of a plurality of data each representative of a signal level of said composite video signal.

6. A video display processor according to claim 3, wherein said video display processor further comprises a second feeding means for feeding said external video image data to the video display unit together with said horizontal and vertical synchronization signals, whereby a video image is displayed on the screen of the video display unit in accordance with said external video image data which is being written into the memory means.

7. A video display processor according to claim 3, wherein said address data generating means comprises a clock generator means for generating a clock signal, first counter means for counting said clock signal and for being reset in accordance with said horizontal synchronization signal, and second counter means for counting an output of said first counter means and being reset in accordance with said vertical synchronization signal, said address generator means generating said address data in accordance with outputs of said first and second counter means.

* * * * *